Oct. 18, 1955     K. E. GORLEY ET AL     2,721,086
HAND TRUCK FOR MASONRY BLOCKS
Filed July 13, 1953
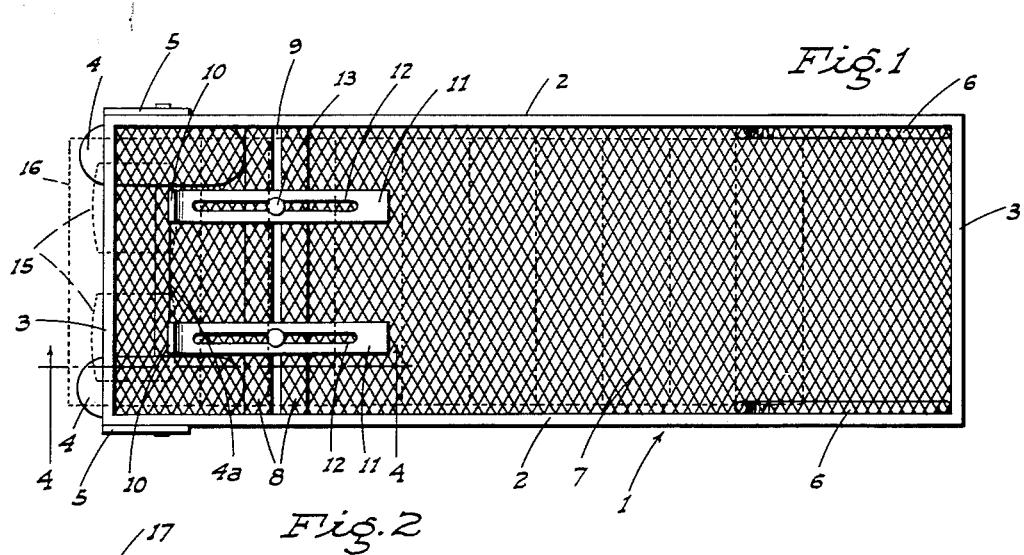
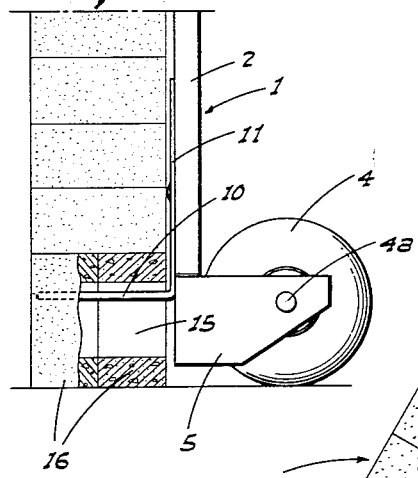
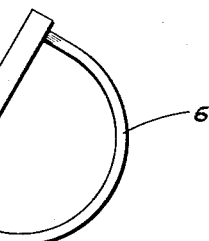
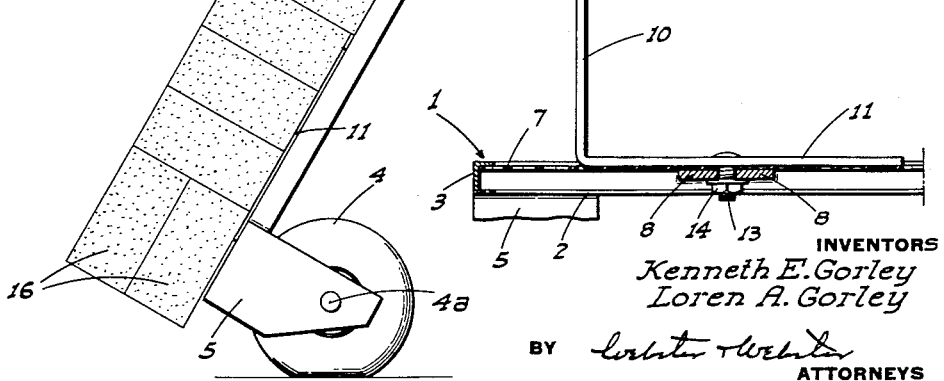
INVENTORS
Kenneth E. Gorley
Loren A. Gorley
BY
ATTORNEYS

United States Patent Office 2,721,086
Patented Oct. 18, 1955

2,721,086

HAND TRUCK FOR MASONRY BLOCKS

Kenneth E. Gorley and Loren A. Gorley, Stockton, Calif.

Application July 13, 1953, Serial No. 367,406

4 Claims. (Cl. 280—47.29)

This invention relates generally to improvements in fork-type hand trucks.

In particular the invention is directed to, and it is a major object to provide, a novel, fork-type hand truck, especially designed—but not limited—for use to pick up, and transport from place to place, a stack of masonry blocks; such blocks being of the kind which are hollow, and the ones at the bottom of the stack being arranged so that the hand truck forks may project into the hollow for pick-up of the stack.

Another important object of the invention is to provide a fork-type hand truck which embodies a novel, adjustable fork assembly; the arrangement being such that the forks—of which there are a pair—are readily adjustable in both transverse and longitudinal directions.

An additional object of the invention is to provide a hand truck with a fork assembly—as in the preceding paragraph—wherein the forks are normally supported on the truck in a rigid or stable manner.

A further object of this invention is to provide a fork-type hand truck which is relatively light weight, but sturdy in its construction; the bed of the truck being of expanded metal lath whereby to minimize weight, while providing an effective bed or backing against which the load may rest while being transported.

It is also an object of the invention to provide a fork-type hand truck which is designed for ease and economy of manufacture, and ready and convenient manipulation when in use.

Still another object of the invention is to provide a practical and reliable hand truck for masonry blocks, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the hand truck; i. e., in position carrying a stack of masonry blocks; the latter being shown in dotted lines.

Fig. 2 is an enlarged fragmentary side elevation showing the hand truck in vertical position against a stack of masonry blocks, preparatory to pick-up of the stack on the forks.

Fig. 3 is a side elevation of the hand truck in carrying position, and with a stack of masonry blocks supported thereon for transport.

Fig. 4 is a fragmentary longitudinal sectional elevation on line 4—4 of Fig. 1.

Referring now more particularly to the characters of reference on the drawings, the novel hand truck comprises an elongated rectangular frame, indicated generally at 1; such frame including side bars 2 and end bars 3, all secured together in rigid relation.

The elongated rectangular frame 1 is supported at its forward end from the ground by means of a pair of transversely spaced, relatively small, balloon-tire wheels 4 carried on rigid brackets 5 which project at right angles in a normally downward direction from the front end portions of said side bars 2. With such arrangement the wheels 4, which are disposed inwardly of the brackets 5, normally lie under the forward portion of the frame 1.

At the rear end the frame 1 is fitted with a pair of semi-circular hand grips 6; such hand grips being secured to and depending from the rear end portions of the side bars 2. In addition to their purpose for manual engagement, when the truck is being manipulated or pushed, the grips 6 also serve as ground engaging supporting legs when the frame is lowered to a horizontal position.

The elongated rectangular frame 1 is fitted, from end to end and from side to side, with a bed 7 of expanded metal lath; such lath, while being relatively light weight, serving as an effective backing for the load carried on the truck, as will hereinafter appear.

Adjacent but short of the forward end thereof, the frame 1 includes, beneath but in engagement with the under side of the bed 7, a cross plate 8 which is fixed at the ends to the side bars 2; such plate being of substantial width lengthwise of the truck.

Centrally between its side edges, and for substantially its full length, the cross plate 8 is slotted, as at 9; such slot thus extending transversely of the bed 7. The bed 7 is also slotted in corresponding relation.

For load pick-up, the track includes a pair of transversely spaced forks 10 which project outwardly from the bed 7 forwardly of the cross plate 8; such forks including, at their inner ends, elongated, rearwardly projecting feet 11 which intersect the cross plate 8, but on the outside of the bed 7.

The feet 11 are longitudinally slotted, as at 12, and bolts 13 extend through the slots 9 and 12, securing the feet 11 in normally fixed but adjustable relation, with the forks 10 transversely spaced, and longitudinally disposed, at predetermined points.

When the bolts 13 are tightened by nuts 14 thereon, the feet 11 are positively and fixedly clamped against the bed 7 at the point of backing by the cross plate 8, which assures that the forks 10 are stable when in use.

By employing the slotted cross plate 8 and slotted feet 11, the forks 10 are capable of a relatively wide range of adjustment, as is desirable.

When the above described hand truck is in use, with the forks 10 pre-adjusted, the truck is first disposed substantially vertical, as in Fig. 2, and is manipulated so that the then forwardly projecting forks 10 extend into the openings 15 of the lowermost ones 16 of a stack 17 of hollow masonry blocks.

With the forks 10 in such position the frame 1 is tilted rearwardly to the position of Fig. 3; the stack then being carried at the bottom on the forks 10, while resting rearwardly against the expanded metal lath bed 7. As so picked up, and supported on the hand truck, the stack 17 of masonry blocks can be effectively and conveniently transported from place to place.

When the stack 17 has been transported to a predetermined point, such stack is re-erected by merely swinging the truck to vertical, whereupon the truck is backed away to withdraw the forks 10 from the openings 15.

With the described fork-type hand truck stacks of hollow masonry blocks, or other similar material—which may include material stacked on pallets—can be readily picked up and transported from place to place without disturbing the stacks.

By reason of the use of low pressure balloon tires on the wheels 4, a cushion effect is obtained when a load is being transported, preventing jouncing of the load as the hand truck traverses uneven ground, and which avoids possible shifting and dropping of such load.

It should also be noted that the wheels 4 are carried on a continuous or full-width axle 4a; the advantage being that such axle, between the wheels, provides a push bar for foot engagement in manipulating the truck.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a hand truck which includes a frame, a cross member disposed transversely of the frame and having a slot therein, a pair of transversely spaced forks projecting outwardly from one end portion of the frame, the forks having feet on the inner ends thereof, the feet having slots therein, the slot in said cross member intersecting the slots in said feet, and means passing through the intersecting slots for securing the forks in connection with the frame in normally fixed but adjustable relation to cause the forks to be selectively and independently adjustable both transversely and longitudinally of said frame.

2. A hand truck comprising an elongated frame including transversely spaced side bars connected by end bars, a bed secured on the frame, wheels supporting the frame at its forward end portion and from beneath, a cross member disposed transversely of the frame and having a slot therein, a pair of transversely spaced forks projecting outwardly from the bed at said forward end portion, the forks having feet on the inner ends thereof, the feet having slots therein, the slot in said cross member intersecting the slots in said feet, and bolts passing through the intersecting slots for securing the forks in normally fixed but adjustable relation to the frame to cause the forks to be selectively and independently adjustable both transversely and longitudinally of said frame.

3. A hand truck comprising an elongated frame including transversely spaced side bars connected by end bars, a bed secured on the frame, wheels supporting the frame at its forward end portion and from beneath, a cross member disposed transversely of the frame and beneath the bed, the cross member having a slot therein, the bed having a transverse slot therein in matching relationship to the slot in the cross member, a pair of transversely spaced forks projecting outwardly from the frame at the forward end portion, the forks having feet on the inner ends thereof, the feet having slots therein and resting on the bed, the slot in said cross member intersecting the slots in said feet, and bolts passing through said intersecting slots and said slot in said bed for securing the forks in normally fixed but adjustable relation to the frame to cause the forks to be selectively and independently adjustable both transversely and longitudinally of said frame.

4. A hand truck comprising an elongated frame including transversely spaced side bars connected by end bars, a bed of open mesh material secured on the frame, wheels supporting the frame at its forward end portion and from beneath, a cross member disposed transversely of the frame and beneath the bed, the cross member having a slot therein, a pair of transversely spaced forks projecting outwardly from the bed at the forward end portion, the forks having feet on the inner ends thereof, the feet having slots therein and resting on the bed, the slot in said cross member intersecting the slots in said feet, and bolts passing through said intersecting slots and the openings in the open mesh material of the bed for securing the forks in normally fixed but adjustable relation to the frame to cause the forks to be selectively and independently adjustable both transversely and longitudinally of said frame.

References Cited in the file of this patent

UNITED STATES PATENTS

| 653,826 | Soule et al. | July 17, 1900 |
| 967,663 | Penfield | Aug. 16, 1910 |
| 1,460,266 | Monroe | June 26, 1923 |
| 1,800,679 | Day | Apr. 14, 1931 |
| 2,668,602 | Cushman | Feb. 9, 1954 |